(12) United States Patent
Shukla et al.

(10) Patent No.: US 10,882,373 B1
(45) Date of Patent: Jan. 5, 2021

(54) HIGH PRESSURE GAS SPRING CONTROLS FOR IMPROVED VEHICLE LEVELING

(71) Applicant: Oshkosh Defense, LLC, Oshkosh, WI (US)

(72) Inventors: Deepak Shukla, Oshkosh, WI (US); David Hansen, Oshkosh, WI (US); Ron Zhang, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 258 days.

(21) Appl. No.: 15/957,319

(22) Filed: Apr. 19, 2018

Related U.S. Application Data

(60) Provisional application No. 62/491,724, filed on Apr. 28, 2017, provisional application No. 62/492,041, filed on Apr. 28, 2017.

(51) Int. Cl.
| | |
|---|---|
| *B60G 17/015* | (2006.01) |
| *F16F 9/512* | (2006.01) |
| *F16F 9/32* | (2006.01) |
| *B60G 11/27* | (2006.01) |
| *B60G 17/052* | (2006.01) |
| *B60G 11/30* | (2006.01) |
| *B60G 17/018* | (2006.01) |
| *F16F 9/02* | (2006.01) |

(52) U.S. Cl.
CPC .......... *B60G 17/0155* (2013.01); *B60G 11/27* (2013.01); *B60G 11/30* (2013.01); *B60G 17/0182* (2013.01); *B60G 17/052* (2013.01); *F16F 9/0218* (2013.01); *F16F 9/3292* (2013.01); *F16F 9/512* (2013.01); *B60G 2202/152* (2013.01); *B60G 2206/42* (2013.01); *B60G 2206/422* (2013.01); *B60G 2400/51222* (2013.01); *B60G 2400/60* (2013.01); *B60G 2500/201* (2013.01); *B60G 2500/30* (2013.01); *B60G 2600/18* (2013.01); *B60G 2800/70* (2013.01); *F16F 2228/066* (2013.01); *F16F 2230/08* (2013.01); *F16F 2230/18* (2013.01)

(58) Field of Classification Search
None
See application file for complete search history.

(56) References Cited

U.S. PATENT DOCUMENTS

| | | |
|---|---|---|
| 5,171,121 A | 12/1992 | Smith et al. |
| 6,266,598 B1 | 7/2001 | Pillar et al. |
| 6,421,593 B1 | 7/2002 | Kempen et al. |
| 6,553,290 B1 | 4/2003 | Pillar |
| 6,757,597 B2 | 6/2004 | Yakes et al. |
| 6,885,920 B2 | 4/2005 | Yakes et al. |
| 6,909,944 B2 | 6/2005 | Pillar et al. |
| 6,922,615 B2 | 7/2005 | Pillar et al. |

(Continued)

*Primary Examiner* — Rami Khatib
(74) *Attorney, Agent, or Firm* — Foley & Lardner LLP

(57) ABSTRACT

Systems and methods for controlling a gas spring in a suspension system. The suspension system includes a gas spring and an accumulator coupled to the gas spring and having a bladder. The accumulator may be in a compressed state and an uncompressed state based on a pressure difference across the bladder. A target amount of gas in the gas spring is determined. The amount of gas in the gas spring is adjusted towards the target amount of gas in accordance with a pressure difference across the bladder based on the difference between the first pressure and the second pressure.

20 Claims, 10 Drawing Sheets

(56) References Cited

U.S. PATENT DOCUMENTS

| | | |
|---|---|---|
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,392,122 B2 | 6/2008 | Pillar et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,756,621 B2 | 7/2010 | Pillar et al. |
| 7,831,363 B2 | 11/2010 | Quigley |
| 8,000,850 B2 | 8/2011 | Nasr et al. |
| 8,095,247 B2 | 1/2012 | Pillar et al. |
| 8,459,619 B2 | 6/2013 | Trinh et al. |
| 8,807,576 B2 * | 8/2014 | Koeske ............... B60G 11/27 280/124.167 |
| 9,062,983 B2 | 6/2015 | Zych |
| 9,114,804 B1 | 8/2015 | Shukla et al. |
| 9,132,736 B1 | 9/2015 | Shukla et al. |
| 9,376,102 B1 | 6/2016 | Shukla et al. |
| 9,452,750 B2 | 9/2016 | Shukla et al. |
| 9,650,032 B2 | 5/2017 | Kotloski et al. |
| 9,656,659 B2 | 5/2017 | Shukla et al. |
| 9,821,789 B2 | 11/2017 | Shukla et al. |
| 9,908,520 B2 | 3/2018 | Shukla et al. |
| 10,029,555 B2 | 7/2018 | Kotloski et al. |
| 2008/0195277 A1 * | 8/2008 | Stiller ............... B60G 17/0523 701/37 |
| 2012/0098172 A1 * | 4/2012 | Trinh ............... B60G 17/0155 267/64.28 |
| 2015/0375592 A1 * | 12/2015 | Lannen ............. B60G 17/0162 701/37 |

* cited by examiner

HIGH PRESSURE GAS SPRING CONTROLS FOR IMPROVED VEHICLE LEVELING

CROSS-REFERENCE TO RELATED APPLICATIONS

This application claims the benefit of U.S. Provisional Application No. 62/492,041, filed Apr. 28, 2017, and U.S. Provisional Application No. 62/491,724, filed Apr. 28, 2017, both of which are incorporated herein by reference in their entireties.

BACKGROUND

The present application relates to suspension systems for vehicles. More specifically, the present application relates to controlling a gas spring in a vehicle suspension system.

Many modern vehicles include suspension systems. These suspension systems typically include a spring and a damper (or other components that emulate or otherwise mimic the features of a spring and a damper). In combination, the spring and damper regulate a ride height for the vehicle.

SUMMARY

According to one embodiment, a suspension system is disclosed. The suspension system includes a gas spring, an accumulator, and a suspension controller. The accumulator is coupled to the gas spring and includes a bladder. The accumulator may be in a compressed state and an uncompressed state based on a pressure difference across the bladder. The suspension controller is operatively connected to the gas spring. The suspension controller executes instructions stored on memory to determine a target amount of gas in the gas spring. The suspension controller executes instructions stored on memory to adjust the amount of gas in the gas spring towards the target amount of gas in accordance with the pressure difference across the bladder.

According to another embodiment, a vehicle is disclosed. The vehicle includes a suspension system. The suspension system includes a gas spring and an accumulator. The accumulator is coupled to the gas spring and includes a bladder. The accumulator may be in a compressed state and an uncompressed state based on a pressure difference across the bladder. The vehicle also includes a controller operatively connected to the gas spring. The controller executes instructions stored on memory to determine a target amount of gas in the gas spring. The controller executes instructions stored on memory to adjust the amount of gas in the gas spring towards the target amount of gas in accordance with the pressure difference across the bladder.

According to another embodiment, a method of controlling a gas spring in a suspension system. The method includes detecting a first pressure on a first side of a bladder of an accumulator coupled to the gas spring. The method includes detecting a second pressure on a second side of the bladder opposite the first side. The method includes determining a target amount of gas in the gas spring. The method includes adjusting the amount of gas in the gas spring towards the target amount of gas in accordance with a pressure difference across the bladder based on the difference between the first pressure and the second pressure.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes various components that improve performance relative to traditional systems. The vehicle may be configured for operation on both paved and rough, off-road terrain. As such, the suspension system may be correspondingly configured to support the weight of the vehicle while providing a comfortable ride quality on both paved and rough, off-road terrain. In some embodiments, the suspension system is configured to change the ride height of the vehicle by lifting or lowering the body of the vehicle with respect to the ground.

Figure 1:
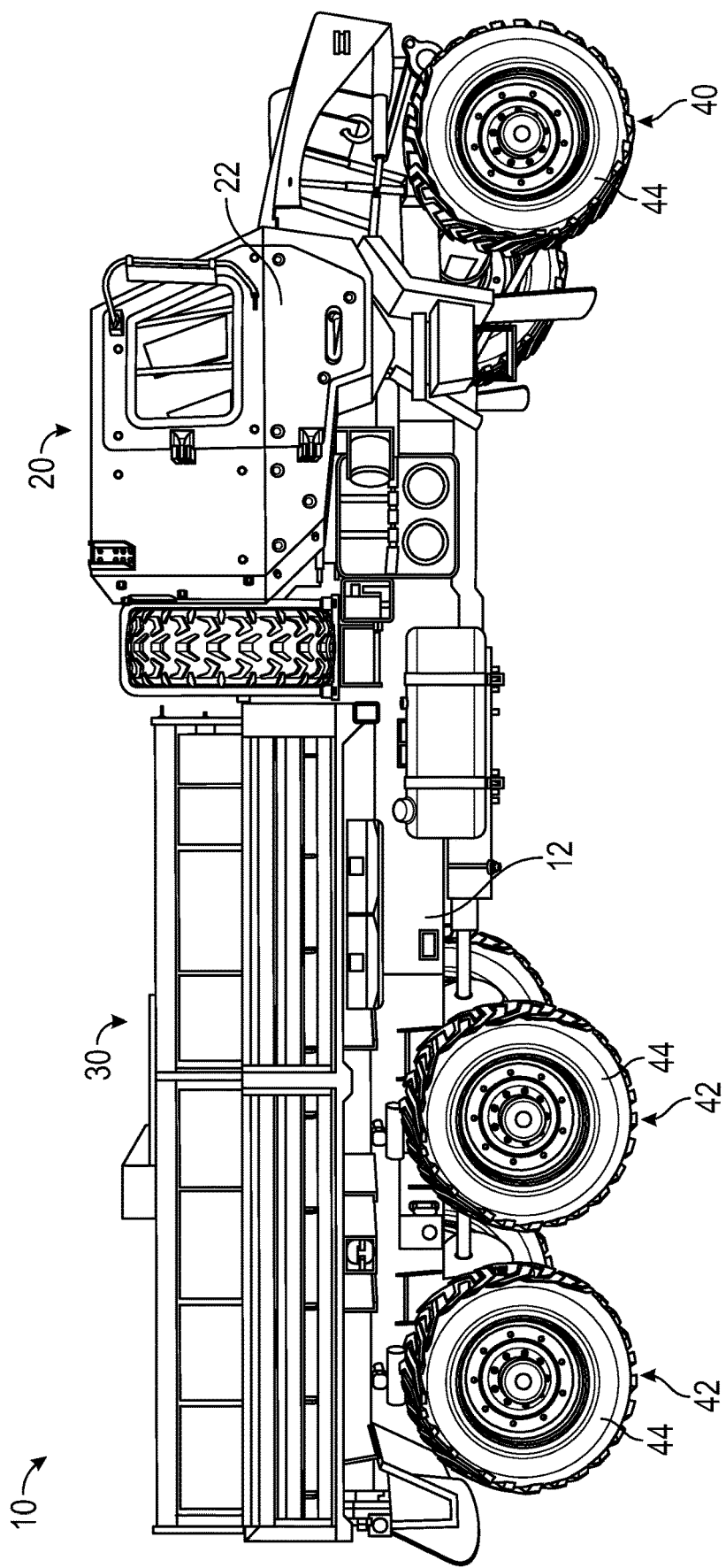
FIG. 1 is a side view of a vehicle, according to an exemplary embodiment.

According to the exemplary embodiment shown in FIG. 1, a vehicle, shown as vehicle 10, includes a chassis, shown as frame 12, that supports a body or body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, a personal vehicle (e.g., an automobile, a motorcycle, etc.), and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or move the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Figure 2:
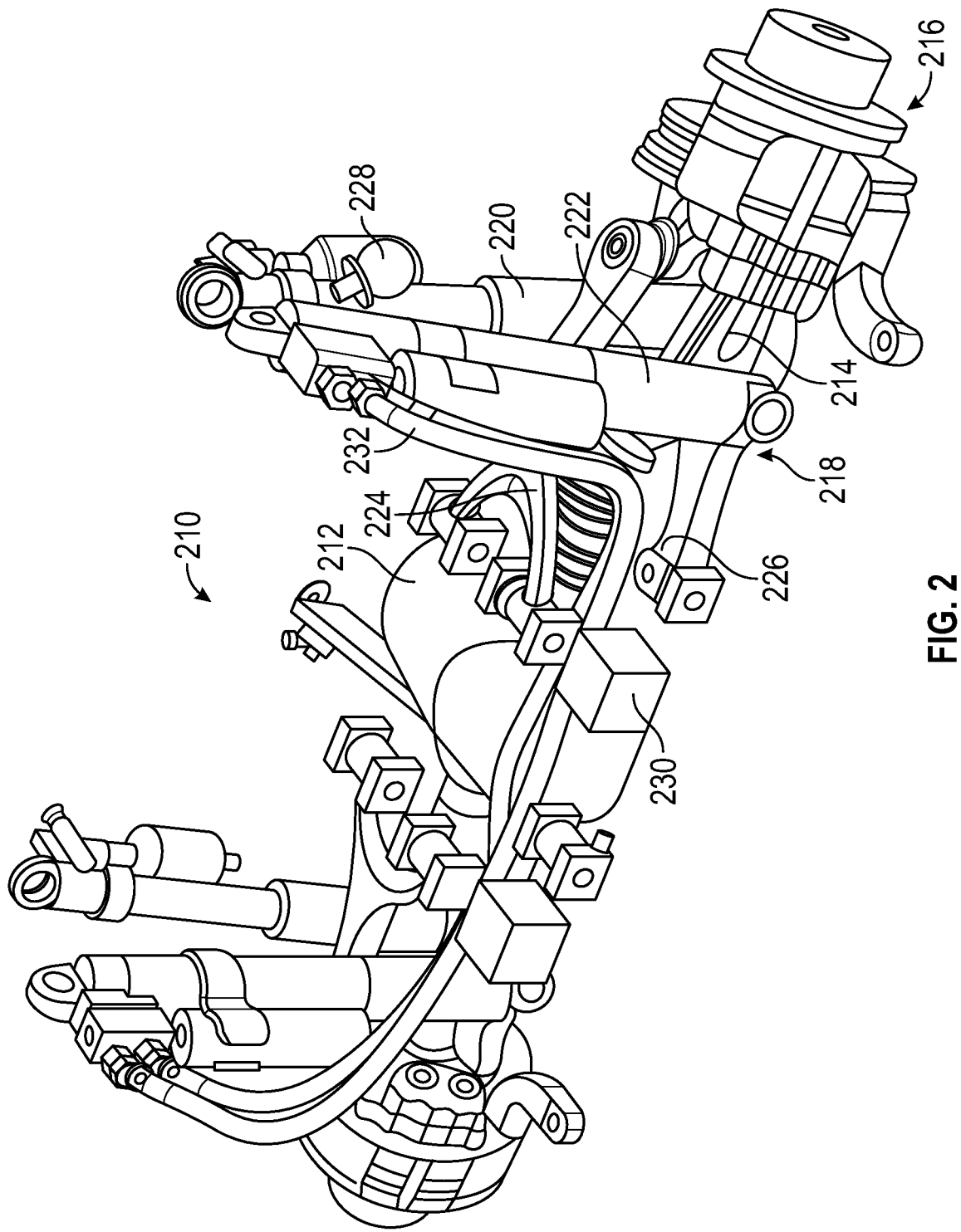
FIG. 2 is a perspective view of an axle assembly, according to an exemplary embodiment.

Referring to FIG. 2, an axle assembly 210 is configured for use with the vehicle 10. The axle assembly 210 may be incorporated into the front tractive assembly 40 and/or the rear tractive assemblies 42. According to an exemplary embodiment, the axle assembly 210 includes a differential 212 connected to half shafts 214, which are each connected to a wheel end assembly 216. The wheel end assembly 216 is at least partially controlled (e.g., supported) by a suspension system 218, which includes a spring 220, a damper 222, an upper support arm 224, and a lower support arm 226 coupling the wheel end assembly 216 to the vehicle body or part thereof (e.g., chassis, side plate, hull).

According to an exemplary embodiment, the differential 212 is configured to be connected with a drive shaft of the vehicle 10, receiving rotational energy from the primary driver of the vehicle 10, such as a diesel engine. The differential 212 allocates torque provided by the primary driver between half shafts 214 of the axle assembly 210. The half shafts 214 deliver the rotational energy to the wheel-end assemblies 216 of the axle assembly 210. The wheel end assemblies 216 may include brakes, gear reductions, steering components, wheel hubs, wheels, and other features. As the vehicle 10 travels over uneven terrain, the upper and lower support arms 224, 226 at least partially guide the movement of each wheel end assembly 216, and a stopper 228 provides an upper bound to movement of the wheel end assembly 216.

Figure 3:
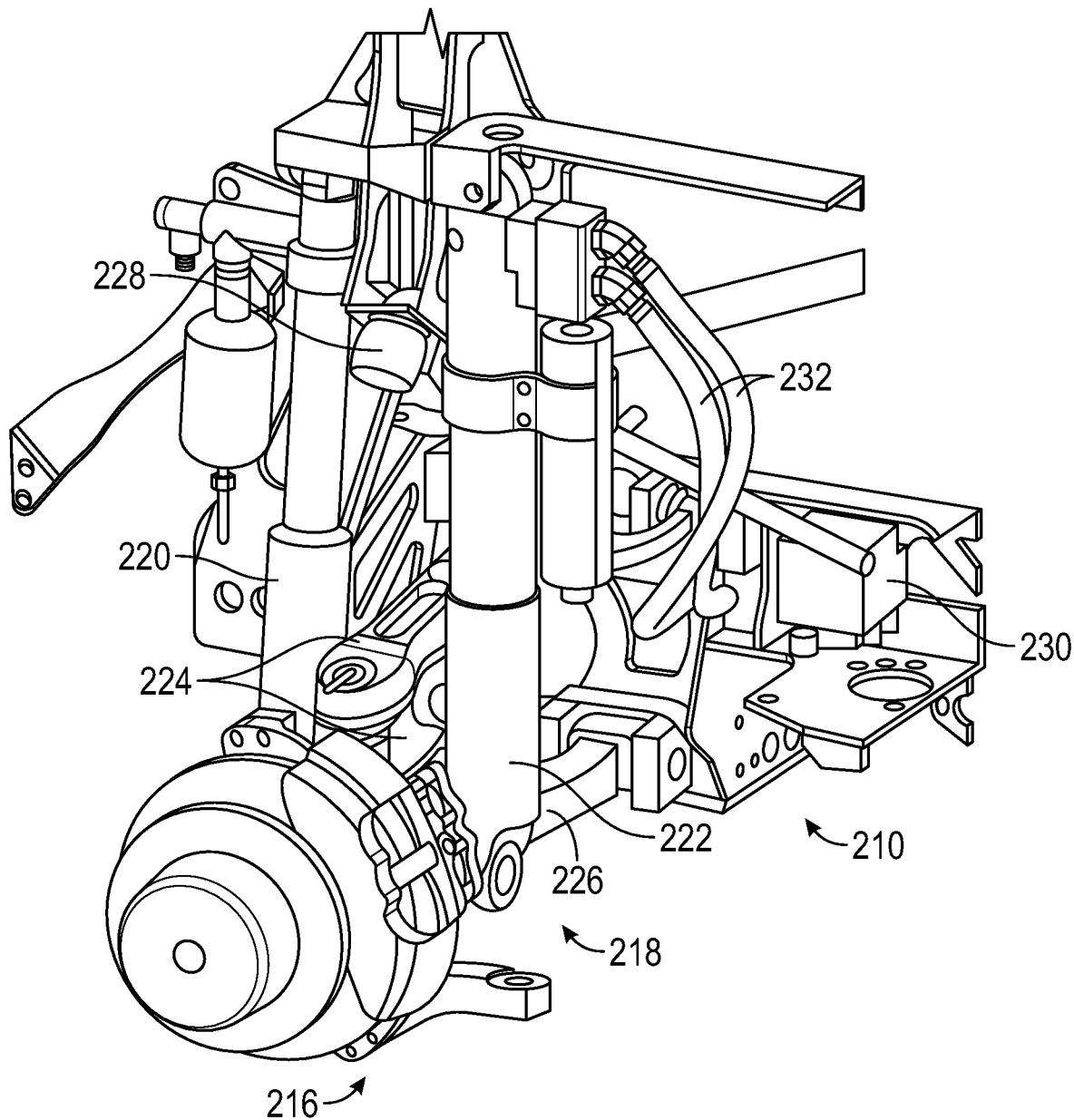
FIG. 3 is a perspective view of a suspension system, according to an exemplary embodiment.

Referring to FIG. 3, according to an exemplary embodiment, the suspension system 218 includes one or more high-pressure gas components, where the spring 220 is a high-pressure gas spring 220. In some embodiments, the suspension system 218 further includes at least one high-pressure gas pump 230. In some such embodiments, the suspension system 218 includes separate high-pressure gas pumps 230 associated with each spring 220 and damper 222 set. In preferred embodiments, the gas of the pump 230 and spring 220 includes (e.g., is at least 90%, at least 95%) an inert gas such as nitrogen, argon, helium, etc., which may be stored, provided, or received in one or more reservoirs (e.g., central reservoir, tank).

During operation, the pump 230 selectively provides gas, under pressure, to the high-pressure gas spring 220 and/or to reservoirs, tanks, accumulators, or other devices. In some contemplated embodiments, two or more dampers 222 of the vehicle are cross-plumbed with lines 232 (e.g., hydraulic lines). Lines 232 may connect dampers 222 on opposite sides of the axle assembly 210 in a "walking beam" configuration.

Figure 4:
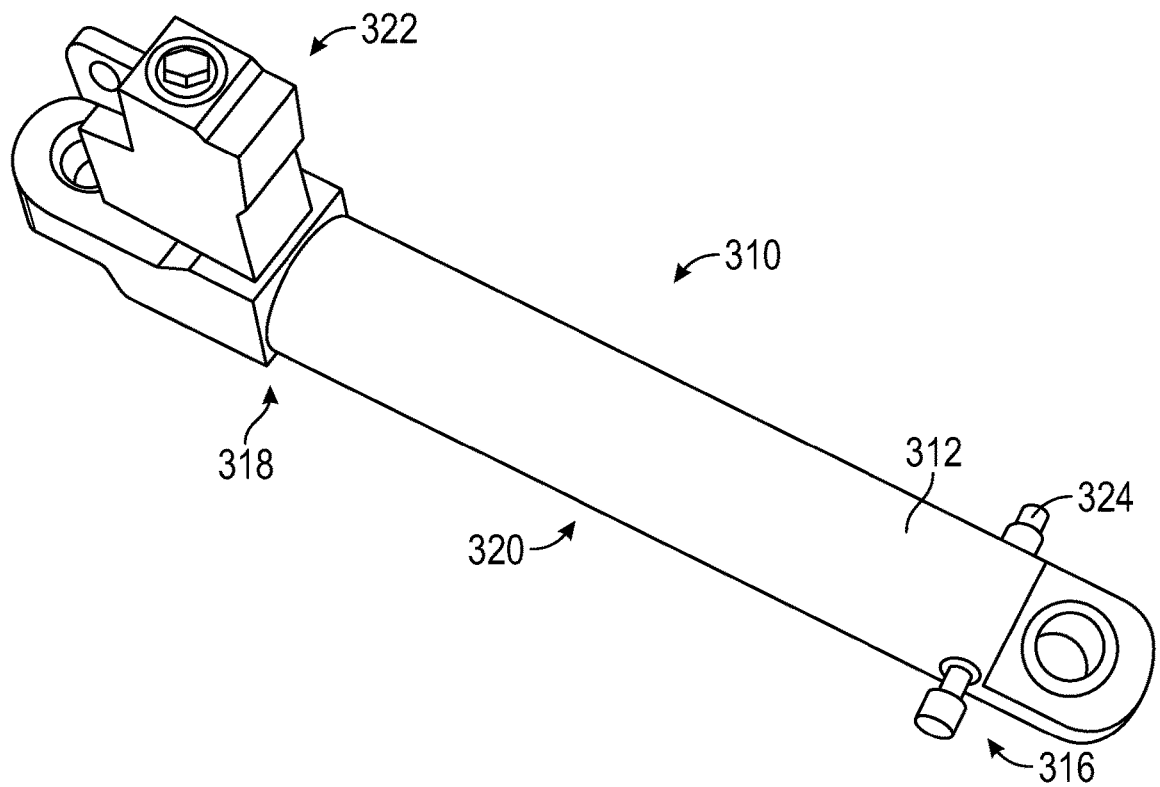
FIG. 4 is a perspective view of a gas spring in a first configuration, according to an exemplary embodiment.
Figure 5:
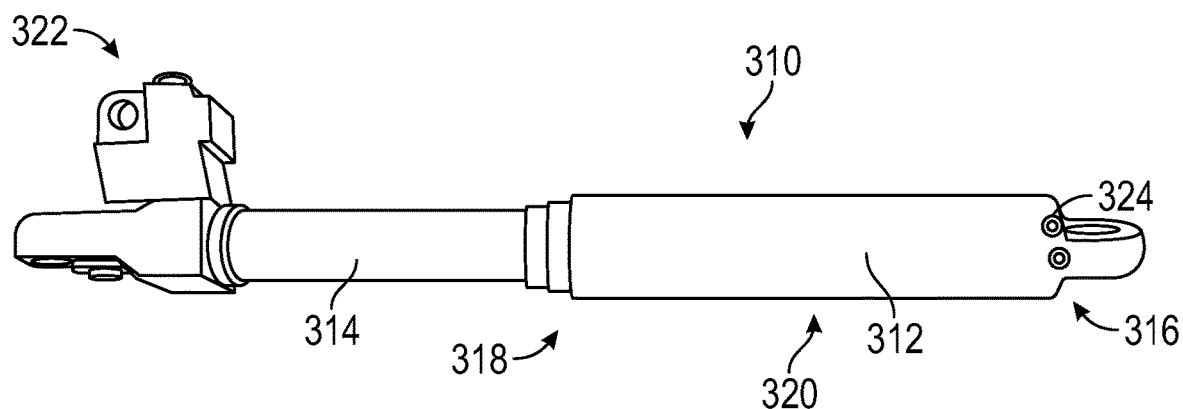
FIG. 5 is a side view of the gas spring of FIG. 4 in a second configuration, according to an exemplary embodiment.

Referring to FIG. 4 and FIG. 5, a gas spring 310 includes a cylinder 312 coupled to a rod 314. The cylinder 312 has a cap end 316, a rod end 318, and a side wall 320 (e.g., cylindrical side wall) extending between the cap and rod ends 316, 318. A chamber is formed between the cylinder 312 and the rod 314. The chamber may be a space defined by the interior of the cylinder 312 surrounded by side wall 320 and between cap end 316 and rod end 318. Nitrogen or another gas held in the chamber compresses or expands in response to relative movement between the rod 314 and the cylinder 312 to provide the receipt, storage, or release of potential energy by the gas spring 310.

The rod 314 is configured to translate with respect to the cylinder 312. According to an exemplary embodiment, the rod 314 is coupled to or includes a piston that forms a wall of the chamber. When the rod 314 translates relative to the cylinder 312, the piston changes the volume of the chamber, compressing the gas in the chamber or facilitating expansion of the gas. The gas in the chamber resists compression, providing a force that is a function of the compressibility of the gas, the area of the piston, the volume and geometry of the chamber, and the initial state (e.g., initial pressure) of the gas, among other factors. The gas spring 310 receives potential energy, stored in the gas, as the gas is compressed and releases the potential energy as the gas expands.

The cylinder 312 of the gas spring 310 is preferably cylindrical due to structural benefits associated with cylindrical pressure vessels. However, in other contemplated embodiments, the cylinder 312 may be substituted for a body having another geometry. In some contemplated embodiments, the chamber is formed in, or at least partially formed in, the rod 314. In one such embodiment, the chamber spans both the cylinder 312 and at least a portion of the interior of the rod 314.

In some embodiments, the gas spring 310 includes at least one port 322 (e.g., aperture, inlet) that may be opened to facilitate providing gas (e.g., inert gas) to or from the chamber. The chamber of the gas spring 310 is substantially sealed when the port 322 is not open. In some embodiments, the port 322 is coupled to an accumulator or to one or more reservoirs. In some embodiments, the spring 310 includes separate ports associated with the accumulator and the pump.

In some embodiments, the gas spring 310 further includes at least one port 324 that may be opened to facilitate coupling a pressurized reservoir of a higher or a lower pressure the gas spring 310. Coupling the higher pressure reservoir to the gas spring 310 increases the pressure in the gas spring 310, causing the gas spring 310 to expand and increasing the ride height of the axle assembly. Conversely, coupling the lower pressure reservoir to the gas spring 310 decreases the pressure in the gas spring 310, causing the gas spring 310 to contract and decreasing the ride height of the axle assembly. In some embodiments, the spring 310 includes separate ports 324 for providing hydraulic fluid to the internal volume and for receiving hydraulic fluid from the internal volume.

In other contemplated embodiments, the gas spring 310 is coupled directly to a pump to increase or decrease pressure in the gas spring 310 to provide a desired ride height. In still another contemplated embodiment, a gas spring further includes at least one port that may be opened to facilitate providing hydraulic fluid (e.g., oil) to or from an internal volume of the gas spring. The internal volume for hydraulic fluid is separated from the chamber for gas. In such contemplated embodiments, adding or removing of hydraulic fluid from the internal volume changes the overall length of the gas spring for different ride heights of the suspension system. However using pressurized gas to change the length of the gas spring 310 may be preferable in some embodiments because of reduced losses (e.g., friction, drag) associated with a flow of gas (e.g., nitrogen) compared to losses associated with the flow of hydraulic fluid (e.g., oil).

Referring now to FIG. 6 through FIG. 8B, a gas spring assembly 410 includes a cylinder 412 coupled to a rod 414, and an accumulator 416. A first chamber 418 is formed between the cylinder 412 and the rod 414 and a second chamber 420 is formed in the accumulator 416. According to an exemplary embodiment, the accumulator 416 includes a rigid exterior 424 (e.g., shell, housing) and a flexible, inflatable bladder 426 within the rigid exterior 424. The second chamber 420 is located between the rigid exterior 424 and the bladder 426. According to an exemplary embodiment, the accumulator 416 is positioned proximate to the cylinder 412 and rod 414, and the second chamber 420 of the accumulator 416 is connected to the first chamber 418, formed between the cylinder 412 and rod 414, by way of a gas transfer conduit 422. The gas transfer conduit 422 may include a valve 428 (e.g., check valve, poppet) positioned to control access between the first and second chambers 418, 420. The valve 428 may optionally disconnect the accumulator 416 from the first chamber 418 and/or contain gas in the second chamber 420 having a pressure exceeding or lower than gas in the first chamber 418.

In some embodiments, when the valve 428 is open, the first chamber 418 is in gaseous communication with the second chamber 420 such that a continuous body of gas extends between the two chambers 418, 420. No intermediate hydraulic fluid or mechanical element is included to transfer energy from the first chamber 418 to the second chamber 420 or vice versa. In some such embodiments, the only hydraulic fluid associated with the gas spring assembly 410 is a thin film between the rod and cylinder that moves during compression or extension of the rod 414. The continuous body of gas for gaseous communication between the first and second chambers 418, 420 is intended to reduce frictional losses associated with energy transfer between the first and second chambers 418, 420, as may otherwise occur with hydraulic or mechanical intermediate elements. However, in other contemplated embodiments, hydraulic or mechanical intermediate elements may be included.

Figure 8A:
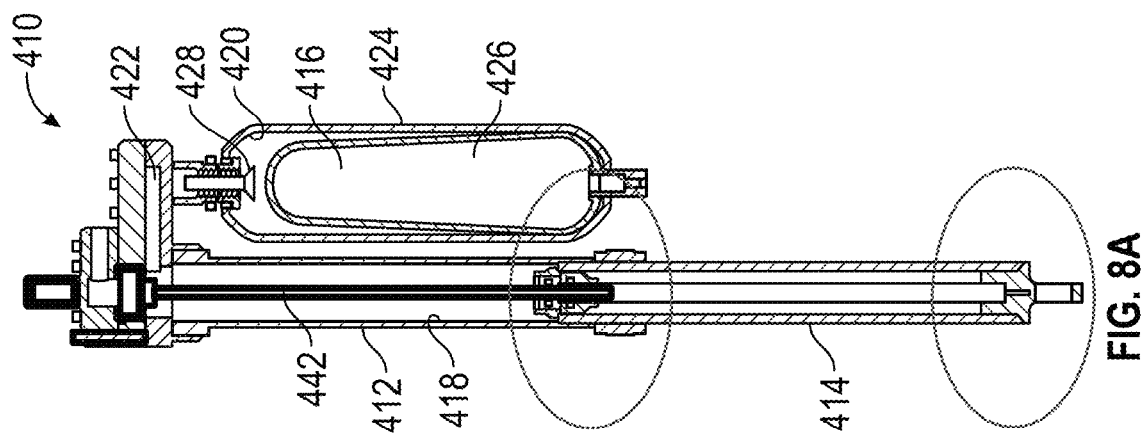
FIG. 8A is a sectional view of the gas spring assembly of FIG. 7, taken along line 8A-8A of FIG. 7, according to an exemplary embodiment.
Figure 7:
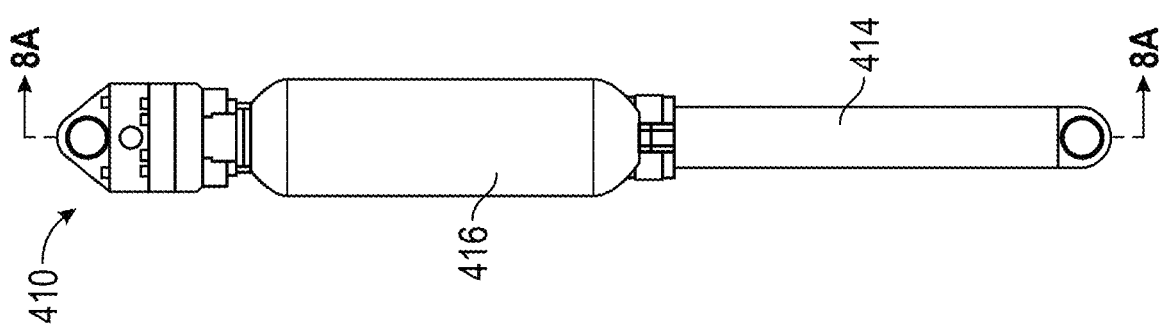
FIG. 7 is a front view of the gas spring assembly of FIG. 5, according to an exemplary embodiment.
Figure 6:
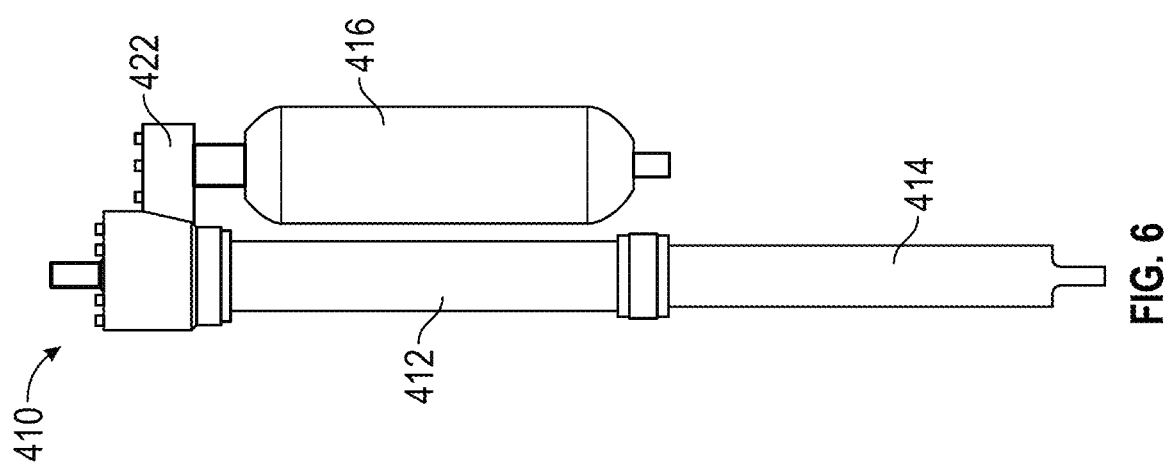
FIG. 6 is a side view of a gas spring assembly, according to an exemplary embodiment.
Figure 8B:
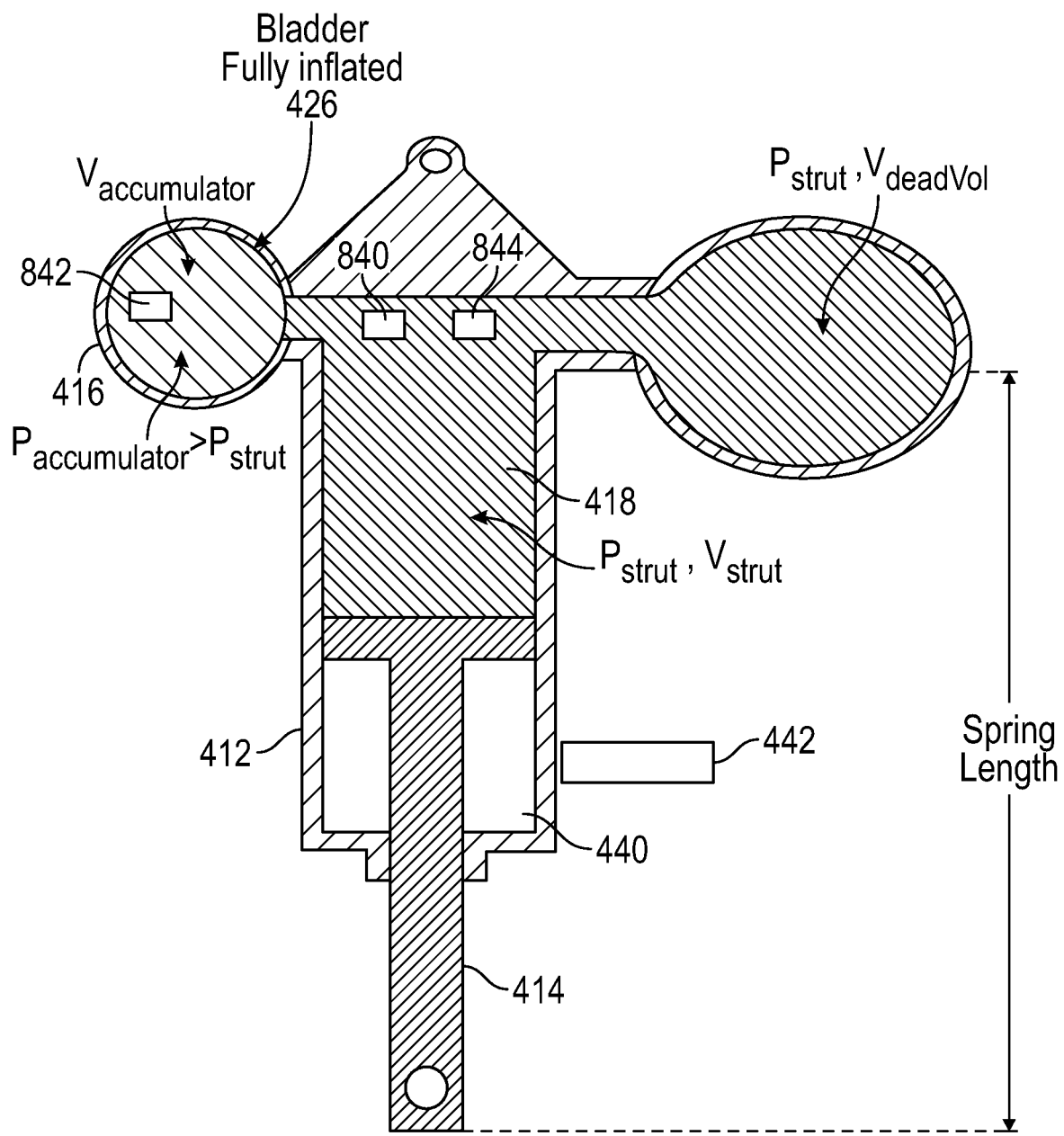
FIG. 8B is a schematic view of a gas spring assembly, according to an exemplary embodiment.

Referring specifically to FIG. 8A and FIG. 8B, in some embodiments, the cylinder 412 is double acting cylinder such that a third chamber 440 located on the opposite side of the rod 414 may additionally be pressurized or depressurized. A gas transfer conduit 422 facilitates providing gas (e.g., inert gas) to or from the third chamber 440. In such embodiments, pressurizing the third chamber 440 actively retracts the rod 414 (e.g., as opposed to using gravity to retract the rod 414, etc.). The rod may be retracted more rapidly using a double acting cylinder than with a single acting cylinder. By way of another example, the rod 414 may be locked in a single location, whereas it may otherwise extend (e.g., if the wheel connected to it was not supported, etc.). By way of another example, the additional force on the rod 414 from the third chamber 440 may be used to overcome friction that might otherwise prevent retraction of the rod 414 (e.g., stiction forces or tire scrub).

During use of the gas spring assembly 410, in some embodiments, the bladder 426 is inflated to an initial pressure. As the rod 414 and cylinder 412 are moved together, such as when the associated vehicle drives over a bump, gas in the chamber 418 compresses, providing a first spring rate for the gas spring assembly 410. In such embodiments, the pressure of the gas in the first chamber 418 is communicated to the accumulator 416 through the transfer conduit 422. If the pressure of the gas communicated from the first chamber 418 is below the initial pressure of the bladder 426, the gas spring assembly 410 will respond to the bump with the first spring rate. However, if the pressure of the gas communicated from the first chamber 418 exceeds the initial pressure in the bladder 426, then the bladder 426 will compress, increasing the effective volume of the second chamber 418, which provides a second spring rate to the gas spring assembly 410. The bladder 426 thereby provides a softening of the suspension against heavy vertical loads.

In some such embodiments, a pump is coupled to the bladder 426 to increase the initial pressure of the bladder 426 and thereby increase the threshold amount of loading required to achieve compression of the bladder 426, which would increase the loading required to initiate the second spring rate. Alternatively, gas may be released from the bladder 426 to decrease the threshold. As such, the value of the initial pressure of the bladder 426 may be set to achieve a desired responsiveness of the gas spring assembly 410. The first and second spring rates reduce peak forces on the vehicle, improving the ride quality and durability of the vehicle. Tuning of the threshold facilitates adjustment of the response of the gas spring assembly 410 depending upon a particular vehicle application.

According to an exemplary embodiment, the gas spring assembly further includes a sensor 442 integrated with the gas spring assembly 410 and configured to sense the relative configuration of the rod 414 and cylinder 412. In some embodiments, the sensor 442 provides a signal (e.g., digital output) that is indicative of the ride height of the associated suspension system based upon the relative configuration of the rod 414 and cylinder 412. In contemplated embodiments, the sensor 442 includes a linear variable differential transformer (LVDT), where a shaft of the LVDT extends through the cylinder 412 to the rod 414. As the rod 414 and cylinder 412 move relative to one another, the shaft of the LVDT provides a signal (e.g., inductive current) that is a function of the movement of the shaft.

Figure 9:
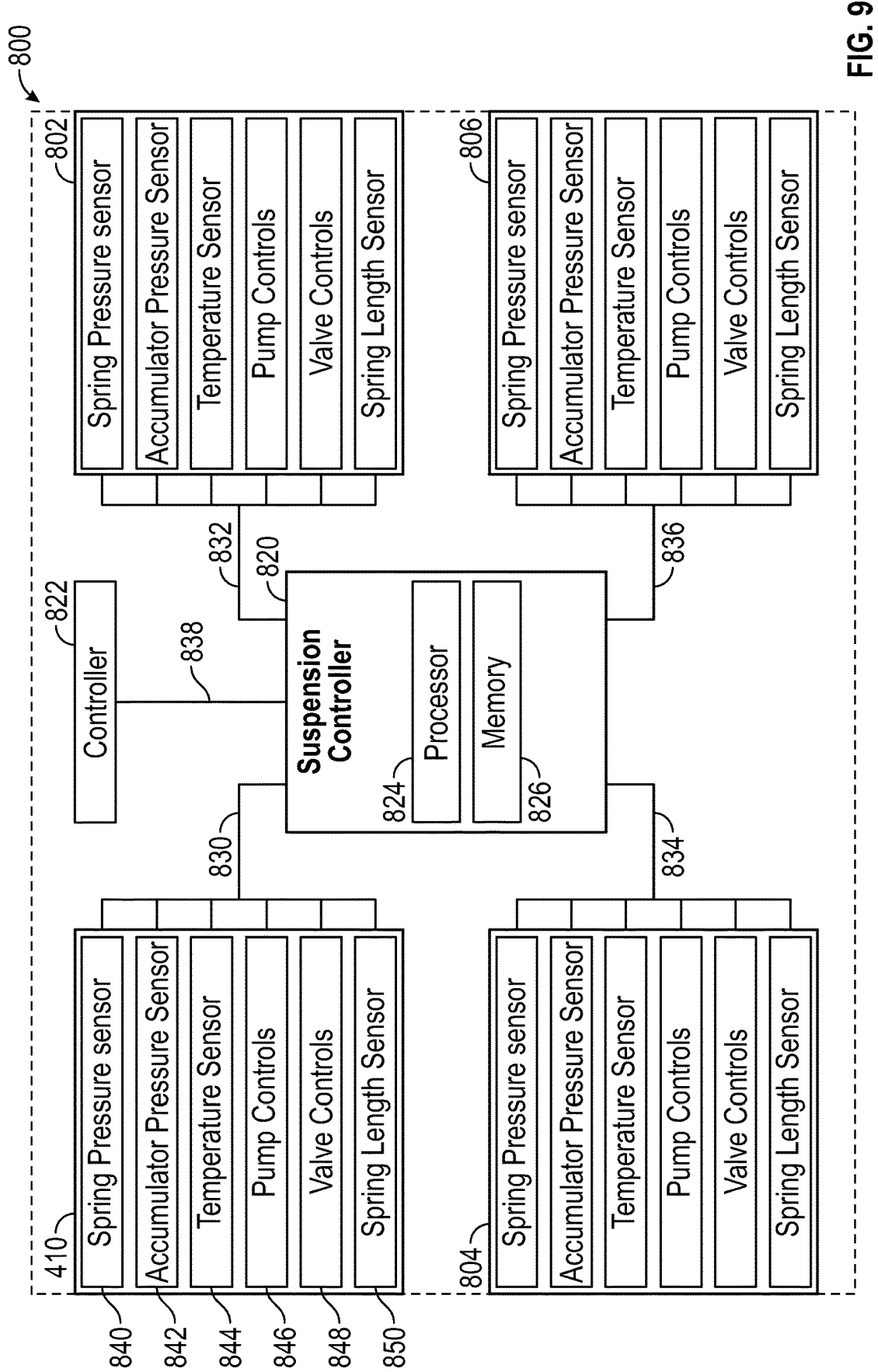
FIG. 9 is a detailed diagram of a vehicle suspension control system, according to an exemplary embodiment.
Figure 10:
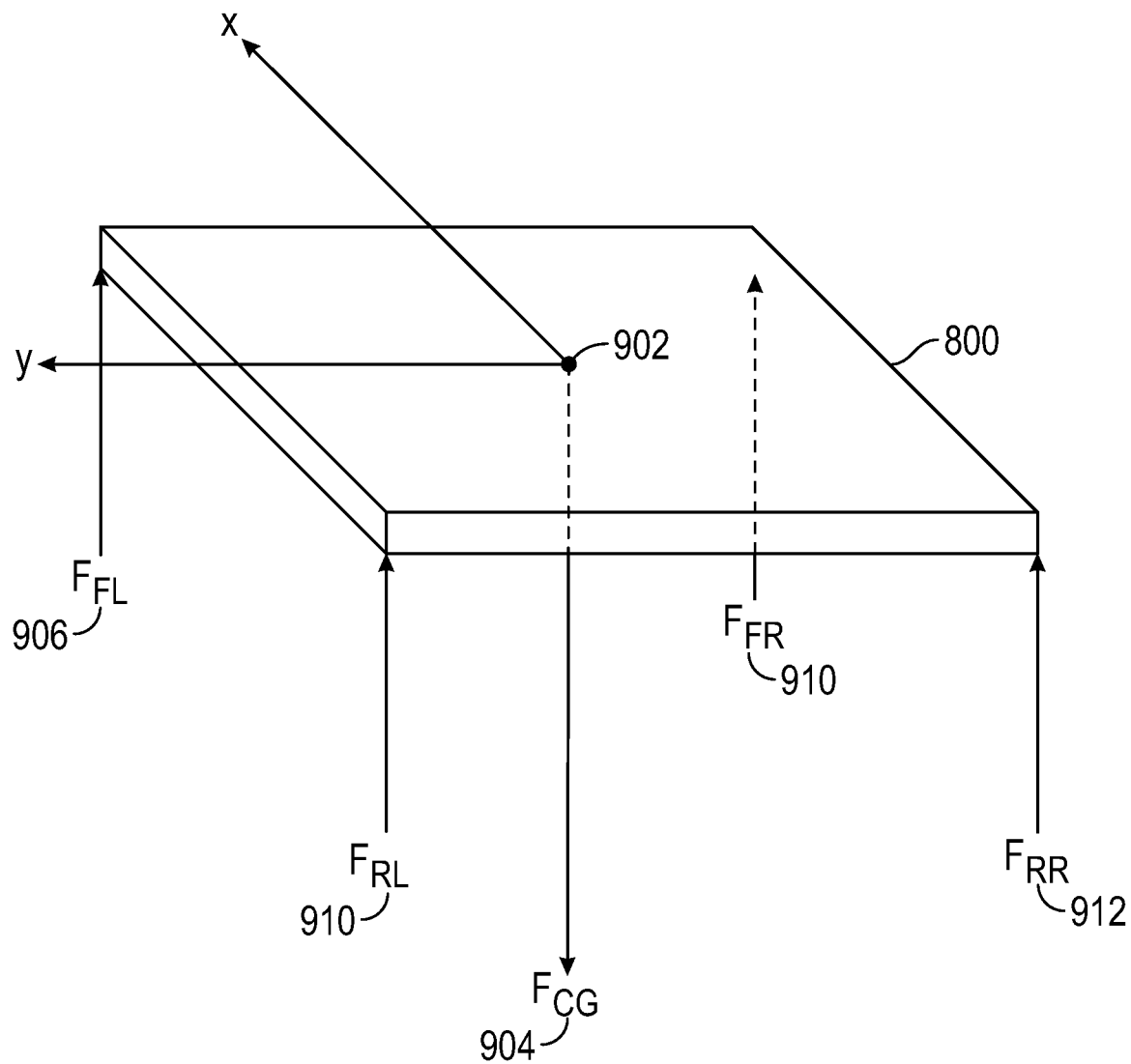
FIG. 10 is a force diagram of a vehicle, according to an exemplary embodiment.

Referring now to FIG. 9, a detailed diagram of a vehicle suspension control system is shown, according to an exemplary embodiment. Vehicle 800 is shown to include gas spring assemblies 410, 802, 804, and 806. Although the vehicle suspension control system is shown to control four gas spring assemblies (e.g., two gas spring assemblies coupled to a front tractive assembly 40 and two gas spring assemblies coupled to a rear tractive assembly 42), it should be understood that the vehicle 10 may include any number of gas spring assemblies (e.g., four, six, eight, etc.) and that the vehicle suspension control system may provide associated control. Suspension controller 820 communicates with spring assemblies 410, 802, 804 and 806 with data lines 830, 832, 834, and 836, respectively. Suspension controller 820 also communicates with controller 822 with data line 838. Suspension controller 820 includes processor 824 and memory 826. Data lines 830, 832, 834, 836, and 838 may be any type of communications medium capable of conveying electronic data between suspension controller 820 and spring assemblies 410, 802, 804, 806, and controller 822. Data lines 830, 832, 834, 836, 838 may be wired connections, wireless connections, or a combination of wired and wireless connections. In some embodiments, data lines 830, 832, 834, 836, 838 are redundant connections. For example, data line 830 may include two or more independent connections between suspension controller 820 and spring assembly 410. In another example, data line 830 may include individual connections between suspension controller 820 and the sensors and controls of spring assembly 410 (e.g., spring pressure sensor 840, valve controls 848, etc.).

Spring assemblies 410, 802, 804, 806 each include sensor and control equipment coupled to data lines 830, 832, 834, and 836. For example, spring assembly 410 may have a spring pressure sensor 840, accumulator pressure sensor 842, temperature sensor 844, pump controls 846, valve controls 848, and spring length sensor 850. Pump controls 846 control the operation of one or more pumps and/or high- and/or low-pressure sources that provide pressurized gas to or from a gas spring and/or an accumulator in spring assembly 410. Valve controls 848 control one or more valves that regulate gas flow between the one or more pumps, the gas spring, and the accumulator. Spring pressure sensor 840 measures the pressure in the gas spring of spring assembly 410 and provides the measured data to suspension controller 820 with data line 830. Accumulator pressure sensor 842 measures the pressure in the accumulator of spring assembly 410 and provides the measured data to suspension controller 820 with data line 830. Spring assembly 410 may also include temperature sensor 844 within the accumulator of spring assembly 410. Spring length sensor 850 measures the current length of the gas spring in spring assembly 410. In other embodiments, spring assemblies 410, 802, 804, 806 include any number of sensors and controls. For example, accumulator pressure sensor 842 may include two or more pressure sensors to provide redundancy for the suspension system in vehicle 800.

Suspension controller 820 is also shown to communicate with controller 822 with data line 838. Controller 822 may be one or more microprocessors that control non-suspension functions of vehicle 800. For example, controller 822 may control the timing of the engine in vehicle 800, the electrical power sent to various lights in vehicle 800, etc. or control any other non-suspension related electronic functions of vehicle 800. In some embodiments, controller 822 is separate from suspension controller 820 and communicates with suspension controller 820 with data line 838. In other embodiments, suspension controller 820 is a part of (or the same as) controller 822.

Controller 822 may also include circuitry that provides an interface for a user. For example, controller 822 may communicate with a handheld computing device operated by a user, and the controller 822 may display information to and/or receive input from the user via the handheld computing device. In other embodiments, controller 822 may communicate with a user interface that includes one or more interactive devices (e.g., a touch-screen display, a keyboard, a mouse, voice-activated controls, etc.) and non-interactive devices (e.g., a monitor, a speaker, etc.) located within vehicle 800. Controller 822 provides the user interactive data to suspension controller 820 with data line 838 and receives data from suspension controller 820 to be presented to a user. For example, a user may provide a preferred vehicle height to suspension controller 820 with controller 822 and/or view the current pressure for a given spring using data provided by suspension controller 820 to a user display via controller 822.

Referring now to FIG. 9, a force diagram of the vehicle suspension system of vehicle 800 is shown, according to an exemplary embodiment. The wheels of vehicle 800 experience resistance forces FFL 906, FFR 908, FRL 910, and FRR 912 from the ground, which correspond to the front left, front right, rear left, and rear right tires, respectively. Vehicle 800 also has a center of mass (e.g., center of gravity) 902 which provides downward force FCG 904.

The suspension controller 820 may control the suspension system of vehicle 800 by calculating a target quantity of gas for each spring and controlling the valves and/or pumps in each spring assembly to achieve the target quantity. Suspension controller 820 may calculate the target quantity of gas using a mass estimate for vehicle 800 and a spring gas volume target at a target ride height. Ride height may correspond with a level or mostly level position for vehicle 800. For example, each spring assembly of vehicle 800 may provide equal spring lengths when vehicle 800 is at rest on a flat surface. In real world operation, adjustment of the suspension of vehicle 800 may not provide an entirely level position due to various environmental conditions (e.g., uneven terrain, friction, etc.). However, the effects of these environmental conditions may be mitigated using the gas law: PV=nRT where P is the spring pressure, V is the spring volume, n is the amount of gas, R is the universal gas constant approximately equal to 8.314 J/(K*mol), and T is the measured temperature in Kelvin. The suspension controller 820 may assume that the temperature of the gas inside each spring assembly does not change appreciably while adjusting the suspension system such that the amount of gas n is proportional to PV. Hereinafter, the amount of gas will be referred to as Q, where Q=PV and incorporates the constants T and R. In other embodiments, the suspension controller 820 may account for the temperature change such that $$Q = \frac{PV}{T}.$$

The suspension controller 820 may estimate value of Q using data from pressure sensors, temperature sensors, volume sensors, or any other sensor in the suspension system of vehicle 800. In one embodiment, Q is calculated using data from flow rate sensors without using data from pressure sensors. In other embodiments, Q is estimated using data from pressure sensors. The temperature T may be measured (e.g., using sensor 844) prior to adjustment of the suspension. The temperature sensor 844 may be located inside the accumulator 416 or in the chamber 418. The suspension controller 820 may be configured to assume the temperature is the same on both sides of the bladder 426. In other embodiments, temperature sensors 844 may be located inside the accumulator 416 and inside the chamber 418.

Suspension controller 820 may be configured to control the suspension system of vehicle 800 by minimizing an error estimation calculated as error=$Q_{target}$−$Q_{current}$, where $Q_{target}$ and $Q_{current}$ are the target and current amounts of gas in the spring assembly 410, respectively. Suspension controller 820 may be configured to treat each spring assembly as a set of smaller volumes, such that $Q_{target}$ and $Q_{current}$ can be calculated from the sum of the amounts of gas in each individual volume. Although the term "minimizing" is used with respect to the error calculation throughout the present specification, it is to be understood that the error calculation is exemplary only and that suspension controller 820 may perform any number of calculations to reduce the difference between the $Q_{target}$ value and the $Q_{current}$ value. In other embodiments, suspension controller 820 may be configured to employ other control methods such as adaptive control, robust control, control methods that do not require the calculation of the actual mass, or any other control method.

Figure 11A:
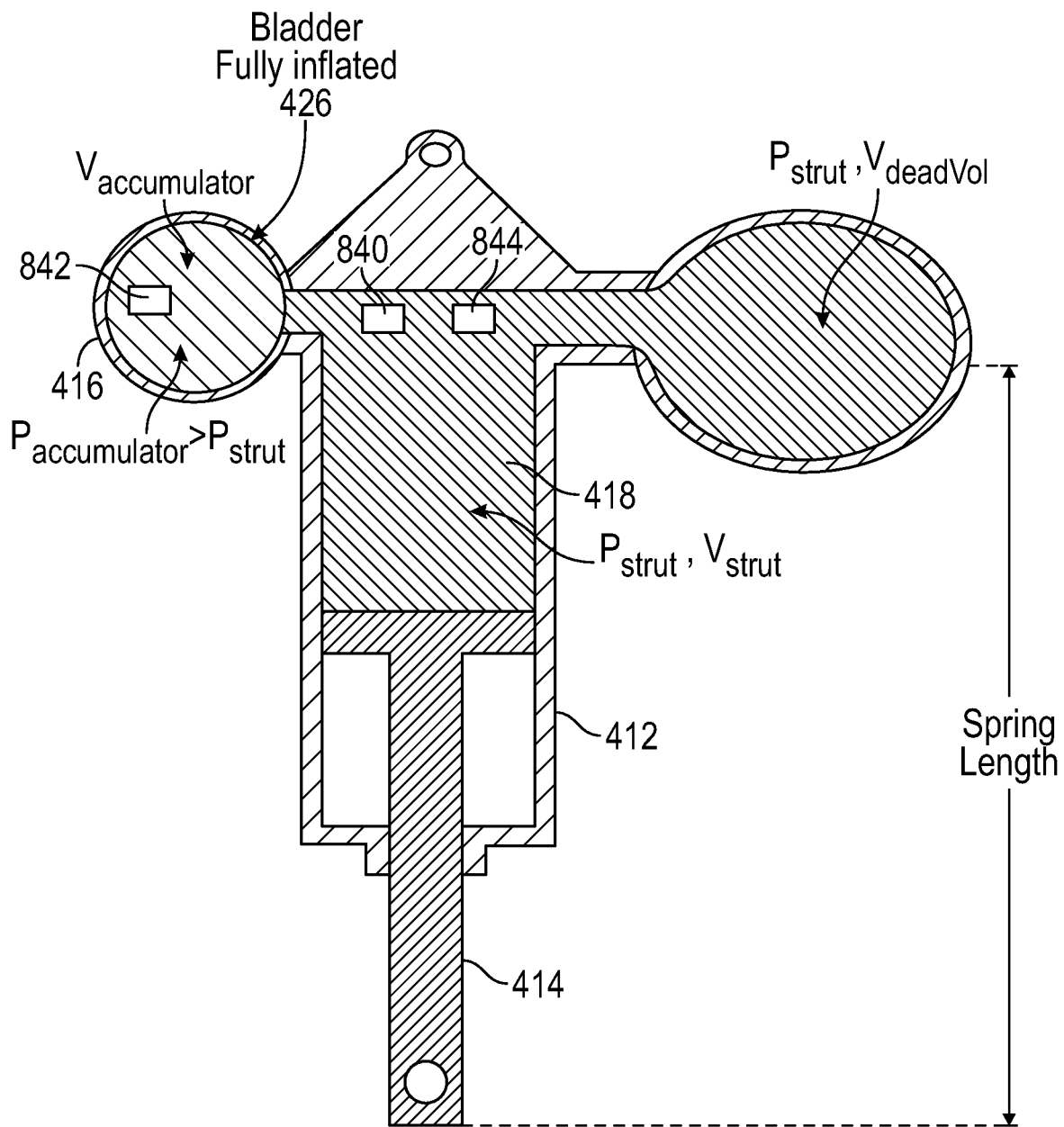
FIGS. 11A and 11B are detailed diagrams of a gas spring assembly, according to an exemplary embodiment.
Figure 11B:
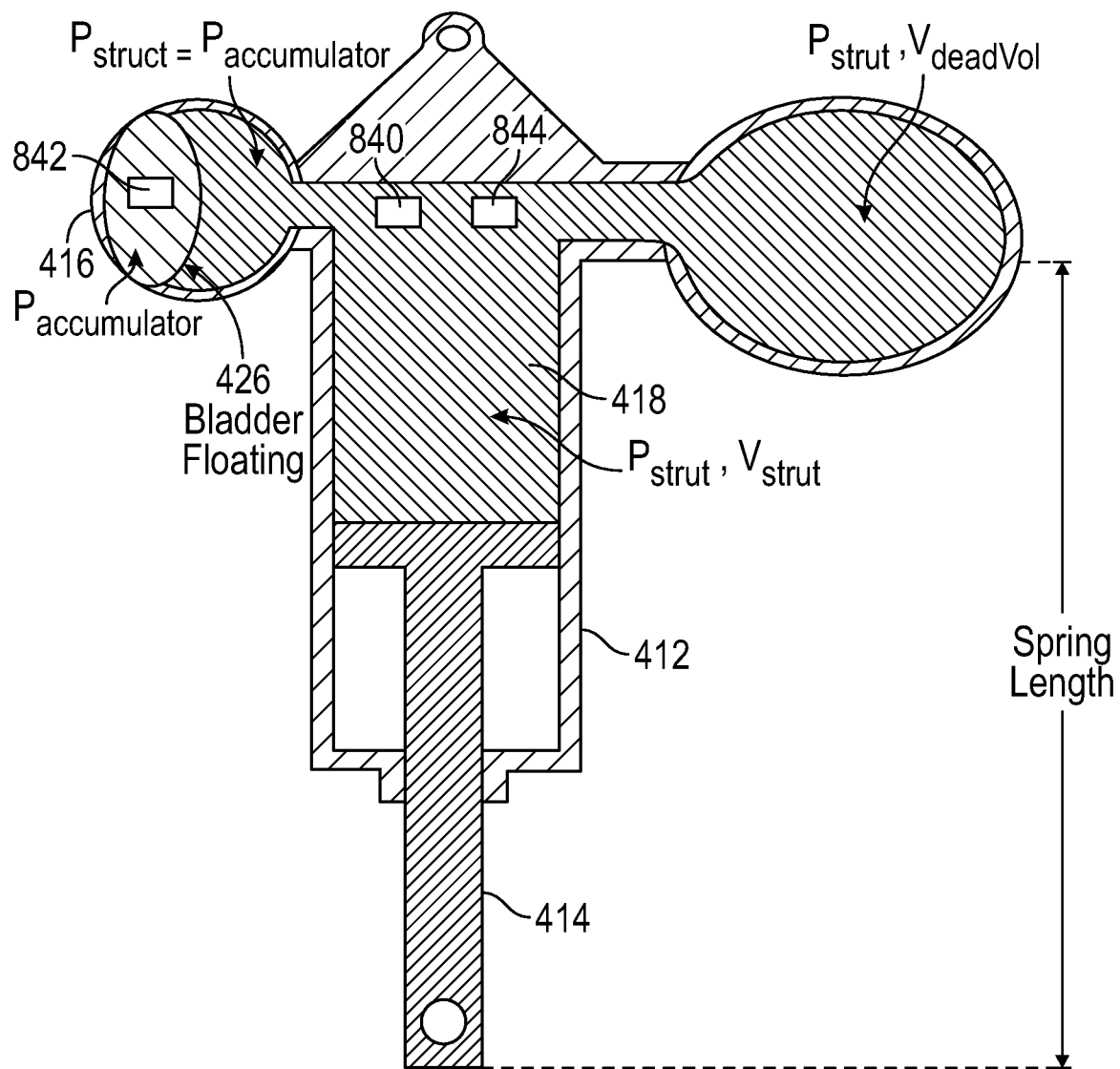

Referring now to FIGS. 11A and 11B, detailed diagrams of spring assembly 410 are shown, according to an exemplary embodiment. Spring assembly 410 is shown with accumulator 416 not compressed (FIG. 11A) and compressed (FIG. 11B).

Suspension controller 820 is configured to calculate overall gas volumes of each spring assembly, $V_{current}$ and $V_{target}$. $V_{current}$ corresponds to the current conditions of the vehicle 800 and may be calculated using the internal geometry of the spring assembly 410 and information from the various sensors. $V_{target}$ corresponds to the "ideal" conditions for vehicle 800 and is calculated using the internal geometry of the spring assembly 410 under these conditions. In another example, the target volume may be calculated using the geometry of spring chamber 418, the geometry of accumulator 416, and/or the geometry of flexible bladder 426 at the target ride height. In some embodiments, $V_{target}$ is a fixed value and stored in the memory of suspension controller 820. In other embodiments, $V_{target}$ may be one or more values that account for different desired heights or non-ideal conditions.

The suspension controller 820 is configured to calculate volumes $V_{current}$ and $V_{target}$ using the internal geometry of the spring assembly. The volumes $V_{current}$ and $V_{target}$ have three smaller volumes: the volume of the accumulator $V_{accumulator}$, a dead volume $V_{deadVol}$, and the volume inside the chamber 418 $V_{strut}$. In the calculation performed by the suspension controller 820, the accumulator volume $V_{accumulator}$ corresponds to the fully inflated volume of the accumulator 416 and is constant, regardless of the position of the bladder 426. The dead volume $V_{deadVol}$ corresponds to a volume of gas present even at a minimum (i.e., fully compressed) spring length. The dead volume $V_{deadVol}$ includes the gas volume present in the chamber 418 when spring is fully compressed and the volume of gas in various tubes that connect the chamber 418 to other related components such as valves, etc. The suspension controller 820 may be configured to treat the dead volume $V_{deadVol}$ as a constant. The volume $V_{strut}$ varies with spring length. In one embodiment, the suspension controller 820 calculates $V_{strut}$ by multiplying the cross-sectional area of the chamber 418 by the spring length as measured by the spring length sensor 850. In another embodiment, corresponding values for spring length and $V_{strut}$ are stored in a lookup table in the memory 826 of suspension controller 820. The suspension controller 820 may be configured to reference the lookup table in addition to the spring length as measured by the spring length sensor 850 to determine $V_{strut}$.

Each volume ($V_{accumulator}$, $V_{deadVol}$, and $V_{strut}$) has an associated pressure ($P_{accumulator}$, $P_{deadVol}$, and $P_{strut}$, respectively). The suspension controller 820 may be configured to assume that any flow restrictions between the dead volume and the spring chamber 418 are negligible such that the pressure in the spring chamber 418, $P_{strut}$, and the pressure in the dead volume, $P_{deadVol}$, are equal. The pressures in the accumulator 416 and the spring chamber 418 may differ from one another, however, due to the separation between the two volumes imposed by the bladder 426. For the purposes of the calculations herein, the pressure in the volume $V_{accumulator}$ may be taken as the greater of the strut pressure $P_{strut}$ and a charge pressure of the accumulator 416 $P_{charge}$. The charge pressure may be the uncompressed pressure of the accumulator 416 and may be set by adding or removing gas on the side of the bladder 426 opposite chamber 418. In some embodiments, the charge pressure is set by a user prior to operation of the vehicle 800. In other embodiments, the charge pressure is variable throughout operation of the vehicle (e.g., by control of a pump coupled to the accumulator 416). In FIG. 11A, accumulator 416 has not been compressed. The pressure in accumulator 416 is greater than the pressure in spring chamber 418 (e.g., $P_{accumulator} > P_{strut}$), and the accumulator pressure is the charge pressure (e.g., $P_{accumulator} = P_{charge}$). In FIG. 11B, accumulator 416 is shown to be compressed. The pressure in the accumulator 416 is equal to the pressure in the spring chamber 418 (e.g., $P_{accumulator} = P_{strut}$). Regardless of the position of the bladder 426, the pressure in the volume $V_{accumulator}$ will be uniform throughout. By way of example, if bladder 426 is fully expanded, the pressure in the accumulator 416 is greater than the pressure in the spring chamber 418, and the pressure throughout volume $V_{accumulator}$ is pressure $P_{charge}$. By way of another example, if the bladder 426 is compressed, the pressure on both sides of the bladder 426 is the same.

The suspension controller 820 is configured to calculate the amounts of gas $Q_{target}$ and $Q_{current}$ from the sum of the amounts of gas in each individual volume. The amount of gas in each individual volume be found by multiplying each individual volume ($V_{accumulator}$, $V_{deadVol}$, and $V_{strut}$) by its corresponding pressure ($P_{accumulator}$, $P_{deadVol}$, and $P_{strut}$, respectively). Utilizing the pressure relationships stated above, the controller is configured to calculate $Q_{current} = P_{strut,current}(V_{strut,current} + V_{deadVol}) + \max(P_{charge}, P_{strut,current})V_{accumulator}$ and $Q_{target} = P_{strut,target}(V_{strut,target} + V_{deadVol}) + \max(P_{charge}, P_{strut,target})V_{accumulator}$, where max (A,B) returns the greater of A and B. The suspension controller 820 is configured to measure the current pressure $P_{strut,current}$ using the spring pressure sensor 840. The suspension controller 820 calculates the current volume $V_{strut,current}$ using the spring length value measured by the spring length sensor 850. The dead volume $V_{deadVol}$ and accumulator volume $V_{accumulator}$ may be constants stored in memory 826.

The suspension controller 820 incorporates the max(A,B) term to account for the potential difference in pressure between the strut volume and the accumulator volume. Because of the bladder 426, the accumulator volume may be the greater of the two pressures $P_{charge}$ and $P_{strut}$. The incorporation of the max(A,B) term facilitates adjusting the height of the vehicle 800 regardless of whether the accumulator 416 is compressed. Other controllers without this term do not account for the gas in the accumulator 416, instead assuming the entire volume of the spring assembly has a consistent pressure. These controllers may not be able to adjust the height of the vehicle accurately when the accumulator 416 is partially compressed. The value of pressure $P_{charge}$ may be provided by a user or measured by the accumulator pressure sensor 842 when the accumulator 416 is not compressed. If the pressure $P_{charge}$ is provided by a user, the vehicle 800 may not include the accumulator pressure sensor 842.

The suspension controller 820 may be configured to determine the volume $V_{strut,target}$ using the desired suspension height. Each suspension height corresponds to a spring length depending on the geometry of the suspension system. The spring length may be used to calculate the strut volume as described above. The suspension controller 820 may determine the desired suspension height from a variety of factors including, but not limited to, a user input, the location of the center of gravity of the vehicle 800, and the desired ride height of the vehicle.

The pressure in the strut, $P_{strut}$, forces the rod 314 out of the chamber and is proportional to the force delivered by the spring assembly. Suspension controller 820 may calculate a target strut pressure, $P_{strut,target}$, for each spring assembly using a mass estimation for vehicle 800. Suspension controller 820 may simplify the calculation of the mass estimation. For example, a linear relationship may be assumed between spring pressures and tire contact forces. Certain geometric relationships in vehicle 800 may additionally or alternatively be assumed to be uniform (e.g., front and rear track widths are identical, each suspension corner is identical in dimensions, etc.). Suspension controller 820 may assume that the vehicle spring mass is only supported by gas pressure. This assumption does not hold true when the spring is at a travel range limit (e.g., the spring is fully compressed or fully extended). In such a case, suspension controller 820 may adjust the spring away from the travel range limit to facilitate calculating the mass. In some embodiments, the adjustment away from the travel range limit is done without regard to a particular target spring length, since the mass estimation is calculable at any spring length that is not at a travel range limit. For example, the suspension may be lowered until it is no longer hitting rebound stops or raised until it is no longer hitting jounce bumpers. One skilled in the art would appreciate that any calculations presented herein can be modified accordingly to account for variations from these assumptions.

The suspension controller 820 may estimate the mass of the vehicle 800 using measured pressure information from each of the spring assemblies, from data provided by a user, or from another source. Using the estimated mass of the vehicle 800, the suspension controller 820 may then calculate $P_{strut,target}$ for each of the spring assemblies. The suspension controller may perform a force and moment balance on the vehicle 800 in addition to applying other constraints on the target pressures for each of the spring assemblies to solve for $P_{strut,target}$. By way of example, in embodiments that include four spring assemblies, the suspension controller 820 may require that a ratio of the pressure in the front spring assembly to the pressure in the rear spring assembly be equal on either side of the vehicle 800. This is intended to minimize cross-loading (e.g., where the front left and rear right springs have a higher loading than the front right and rear left springs). By way of another example, in embodiments with two rear tractive assemblies 42, the suspension controller 820 may balance the loading between the two rear tractive assemblies 42.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A suspension system, comprising:
    a gas spring;
    an accumulator coupled to the gas spring and including a bladder, the accumulator having a compressed state and an uncompressed state, the accumulator being in the compressed state or the uncompressed state based on a pressure difference across the bladder, and the accumulator including a volume of gas located therein;
    a first sensor arranged to detect a first pressure on a first side of the bladder;
    a second sensor arranged to detect a second pressure on a second side of the bladder opposite the first side; and
    a suspension controller operatively connected to the gas spring, the suspension controller executing instructions stored on memory to:
        determine an amount of gas in a spring assembly including the gas spring and the accumulator by multiplying the volume of gas in the accumulator with one of the first pressure and the second pressure;
        determine a target amount of gas in the spring assembly; and
        adjust the amount of gas in the spring assembly towards the target amount of gas.

2. The suspension system of claim 1, wherein the suspension controller multiplies the volume of gas in the accumulator with the greater of the first pressure and the second pressure.

3. The suspension system of claim 1, wherein the suspension controller determines the target amount of gas by:
    determining a target spring length;
    determining, based on the target spring length, a gas spring volume associated therewith;
    estimating a mass of a body acting on the gas spring;
    determining a target pressure based on the gas spring volume and the estimated mass; and
    determining the target amount of gas by 1) multiplying the target pressure and the gas spring volume and 2) adding thereto the volume of gas located in the accumulator multiplied by the greater of a) the target pressure and b) a pressure in the accumulator.

4. A vehicle, comprising:
    a suspension system, the suspension system including:
        a gas spring;
        an accumulator coupled to the gas spring and including a bladder, the accumulator having a compressed state and an uncompressed state, the accumulator being in the compressed state or the uncompressed state based on a pressure difference across the bladder, and the accumulator including a volume of gas located therein;
        a first sensor arranged to detect a first pressure on a first side of the bladder; and a second sensor arranged to detect a second pressure on a second side of the bladder opposite the first side; and a controller operatively connected to the gas spring, the controller executing instructions stored on memory to:
determine an amount of gas in a spring assembly including the gas spring and the accumulator by multiplying the volume of gas in the accumulator with one of the first pressure and the second pressure;
determine a target amount of gas in the spring assembly; and
adjust the amount of gas in the spring assembly towards the target amount of gas.

5. The vehicle of claim 4, wherein the controller multiplies the volume of gas in the accumulator with the greater of the first pressure and the second pressure.

6. The vehicle of claim 4, wherein the controller determines the target amount of gas by:
determining a target spring length;
determining, based on the target spring length, a gas spring volume associated therewith;
estimating a mass of a body acting on the gas spring;
determining a target pressure based on the gas spring volume and the estimated mass; and
determining the target amount of gas by 1) multiplying the target pressure and the gas spring volume and 2) adding thereto the volume of gas located in the accumulator multiplied by the greater of a) the target pressure and b) a pressure in the accumulator.

7. A method of controlling a gas spring in a suspension system, the method comprising:
detecting a first pressure on a first side of a bladder of an accumulator coupled to the gas spring, wherein the accumulator includes a volume of gas located therein;
detecting a second pressure on a second side of the bladder opposite the first side;
determining an amount of gas in a spring assembly that includes the gas spring and the accumulator, wherein determining the amount of gas comprises multiplying the volume of gas in the accumulator with the greater of the first pressure and the second pressure;
determining a target amount of gas in the spring assembly; and
adjusting the amount of gas in the spring assembly towards the target amount of gas.

8. A method of controlling a gas spring in a suspension system, the method comprising:
detecting a first pressure on a first side of a bladder of an accumulator coupled to the gas spring;
detecting a second pressure on a second side of the bladder opposite the first side;
determining a target spring length;
determining, based on the target spring length, a gas spring volume associated therewith;
estimating a mass of a body acting on the gas spring;
determining a target pressure based on the gas spring volume and the estimated mass;
determining a target amount of gas in a spring assembly that includes the gas spring and the accumulator by 1) multiplying the target pressure and the gas spring volume and 2) adding thereto a volume of gas located in the accumulator multiplied by the greater of a) the target pressure and b) a pressure in the accumulator; and
adjusting an amount of gas in the spring assembly towards the target amount of gas.

9. A suspension system, comprising:
a gas spring;
an accumulator coupled to the gas spring and including a bladder, the accumulator having a compressed state and an uncompressed state, the accumulator being in the compressed state or the uncompressed state based on a pressure difference across the bladder; and
a suspension controller operatively connected to the gas spring, the suspension controller executing instructions stored on memory to:
determine a target amount of gas in a spring assembly that includes the gas spring and the accumulator according to:

$$Q_{target}=P_{s,target}(V_{s,target}+V_{deadvol})+\max(P_{accumulator}, P_{s,target})V_{accumulator}$$

where $P_{s,target}$ is a target pressure for the gas spring, $V_{s,target}$ is a target volume in the gas spring based on a length of the gas spring, $V_{deadvol}$ is a constant volume in the gas spring, $P_{accumulator}$ is a pressure within the in the accumulator, $V_{accumulator}$ is a constant volume in the accumulator, and $\max(P_{accumulator}, P_{s,target})$ is whichever of $P_{accumulator}$ and $P_{s,target}$ is greater; and
adjust an amount of gas in the spring assembly towards the target amount of gas.

10. The suspension system of claim 9, wherein $P_{accumulator}$ is a preset pressure.

11. The suspension system of claim 9, wherein the suspension controller further executes instructions to:
estimate a mass of a body acting on the gas spring; and
calculate the target pressure for the gas spring based on the estimated mass.

12. The suspension system of claim 9, further comprising:
a first sensor arranged to detect a first pressure on a first side of the bladder; and
a second sensor arranged to detect a second pressure on a second side of the bladder opposite the first side, wherein the suspension controller determines the amount of gas in the spring assembly based on the first pressure and the second pressure.

13. The suspension system of claim 12, wherein the second side of the bladder faces an interior portion of the gas spring, and wherein the suspension controller determines $P_{accumulator}$ using the first sensor.

14. A suspension system, comprising:
a gas spring;
an accumulator coupled to the gas spring and including a bladder, the accumulator having a compressed state and an uncompressed state, the accumulator being in the compressed state or the uncompressed state based on a pressure difference across the bladder; and
a suspension controller operatively connected to the gas spring, the suspension controller executing instructions stored on memory to:
determine a target spring length;
determine, based on the target spring length, a gas spring volume associated therewith;
estimate a mass of a body acting on the gas spring;
determine a target pressure based on the gas spring volume and the estimated mass;
determine a target amount of gas by 1) multiplying the target pressure and the gas spring volume and 2) adding thereto a volume of gas located in the accumulator multiplied by the greater of a) the target pressure and b) a pressure in the accumulator; and adjust an amount of gas in a spring assembly toward the target amount of gas, the spring assembly including the gas spring and the accumulator.

15. A vehicle, comprising:
a suspension system, the suspension system including:
a gas spring; and
an accumulator coupled to the gas spring and including a bladder, the accumulator having a compressed state and an uncompressed state, the accumulator being in the compressed state or the uncompressed state based on a pressure difference across the bladder; and
a controller operatively connected to the gas spring, the controller executing instructions stored on memory to:
determine a target amount of gas in a spring assembly that includes the gas spring and the accumulator according to:

$$Q_{target} = P_{s,target}(V_{s,target} + V_{deadvol}) + \max(P_{accumulator}, P_{s,target})V_{accumulator}$$

where $P_{s,target}$ is a target pressure for the gas spring, $V_{s,target}$ is a target volume in the gas spring based on a length of the gas spring, $V_{deadvol}$ is a constant volume in the gas spring, $P_{accumulator}$ is a pressure within the in the accumulator, $V_{accumulator}$ is a constant volume in the accumulator, and $\max(P_{accumulator}, P_{s,target})$ is whichever of $P_{accumulator}$ and $P_{s,target}$ is greater; and
adjust an amount of gas in the spring assembly towards the target amount of gas in accordance with the pressure difference across the bladder.

16. The vehicle of claim 15, wherein $P_{accumulator}$ is a preset pressure.

17. The vehicle of claim 15, wherein the controller further executes instructions to:
estimate a mass of a body acting on the gas spring; and
calculate the target pressure for the gas spring based on the estimated mass.

18. The vehicle of claim 15, further comprising:
a first sensor arranged to detect a first pressure on a first side of the bladder; and
a second sensor arranged to detect a second pressure on a second side of the bladder opposite the first side, wherein the controller determines the amount of gas in the spring assembly based on the first pressure and the second pressure.

19. A suspension system, comprising:
a suspension system, the suspension system including:
a gas spring; and
an accumulator coupled to the gas spring and including a bladder, the accumulator having a compressed state and an uncompressed state, the accumulator being in the compressed state or the uncompressed state based on a pressure difference across the bladder; and
a controller operatively connected to the gas spring, the controller executing instructions stored on memory to:
determine a target spring length;
determine, based on the target spring length, a gas spring volume associated therewith;
estimate a mass of a body acting on the gas spring;
determine a target pressure based on the gas spring volume and the estimated mass;
determine a target amount of gas by 1) multiplying the target pressure and the gas spring volume and 2) adding thereto a volume of gas located in the accumulator multiplied by the greater of a) the target pressure and b) a pressure in the accumulator; and
adjust an amount of gas in a spring assembly toward the target amount of gas, the spring assembly including the gas spring and the accumulator.

20. A method of controlling a gas spring in a suspension system, the method comprising:
detecting a first pressure on a first side of a bladder of an accumulator coupled to the gas spring;
detecting a second pressure on a second side of the bladder opposite the first side;
determining a target amount of gas in a spring assembly that includes the gas spring and the accumulator according to:

$$Q_{target} = P_{s,target}(V_{s,target} + V_{deadvol}) + \max(P_{accumulator}, P_{s,target})V_{accumulator}$$

where $P_{s,target}$ is a target pressure for the gas spring, $V_{s,target}$ is a target volume in the gas spring based on a length of the gas spring, $V_{deadvol}$ is a constant volume in the gas spring, $P_{accumulator}$ is a pressure within the in the accumulator, $V_{accumulator}$ is a constant volume in the accumulator, and $\max(P_{accumulator}, P_{s,target})$ is whichever of $P_{accumulator}$ and $P_{s,target}$ is greater; and
adjusting an amount of gas in the spring assembly towards the target amount of gas based on the first pressure and the second pressure.

* * * * *